Aug. 24, 1965  J. E. NOWAK ETAL  3,202,353
YARDAGE INDICATOR ATTACHMENT FOR A GOLF CART
Filed Oct. 15, 1963  2 Sheets-Sheet 1
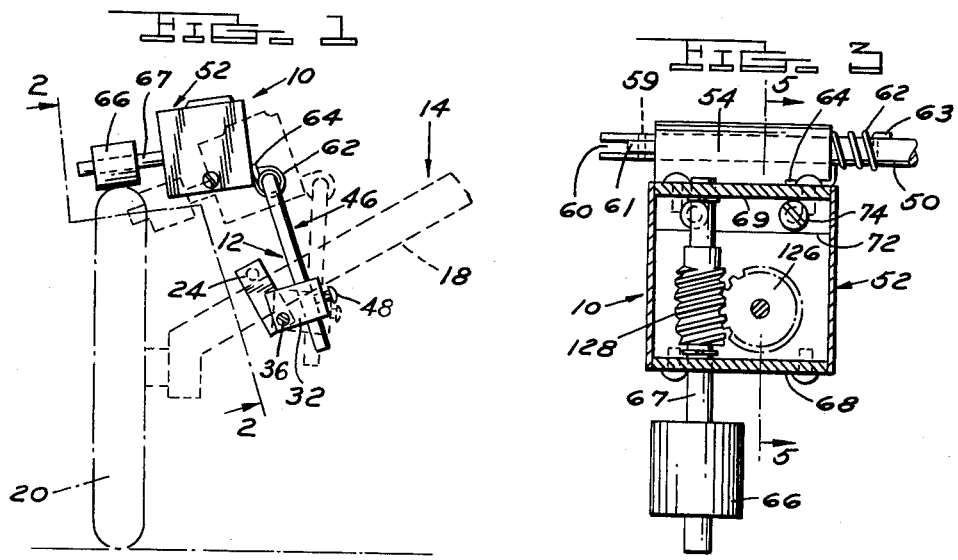
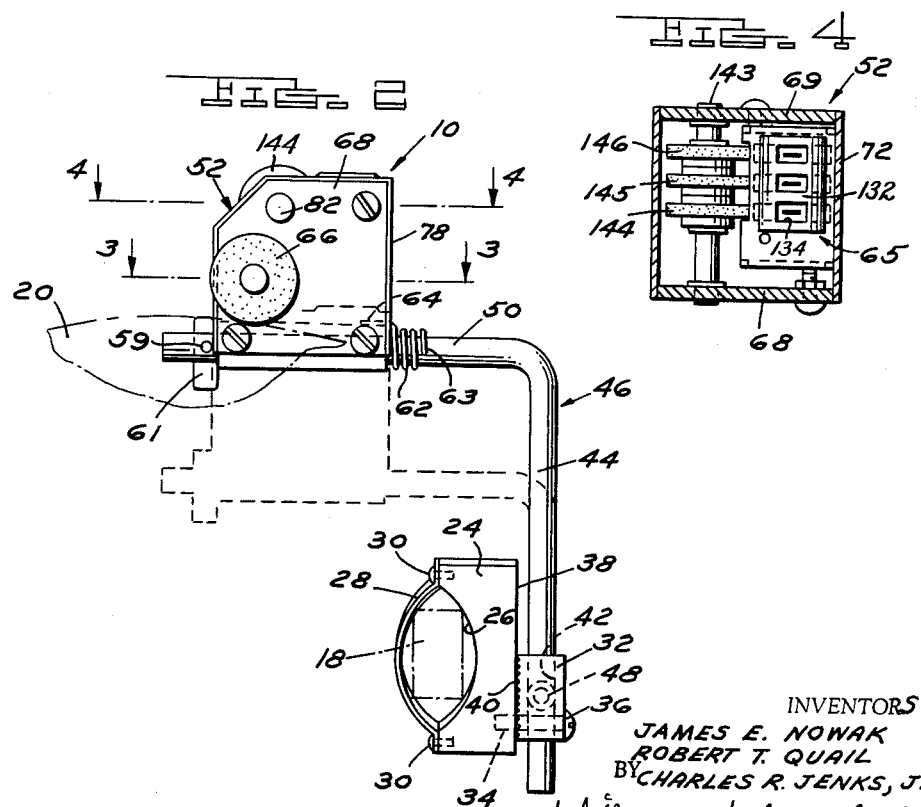
INVENTORS
JAMES E. NOWAK
ROBERT T. QUAIL
CHARLES R. JENKS, JR.
BY Whittemore, Hulbert & Belknap
ATTORNEYS

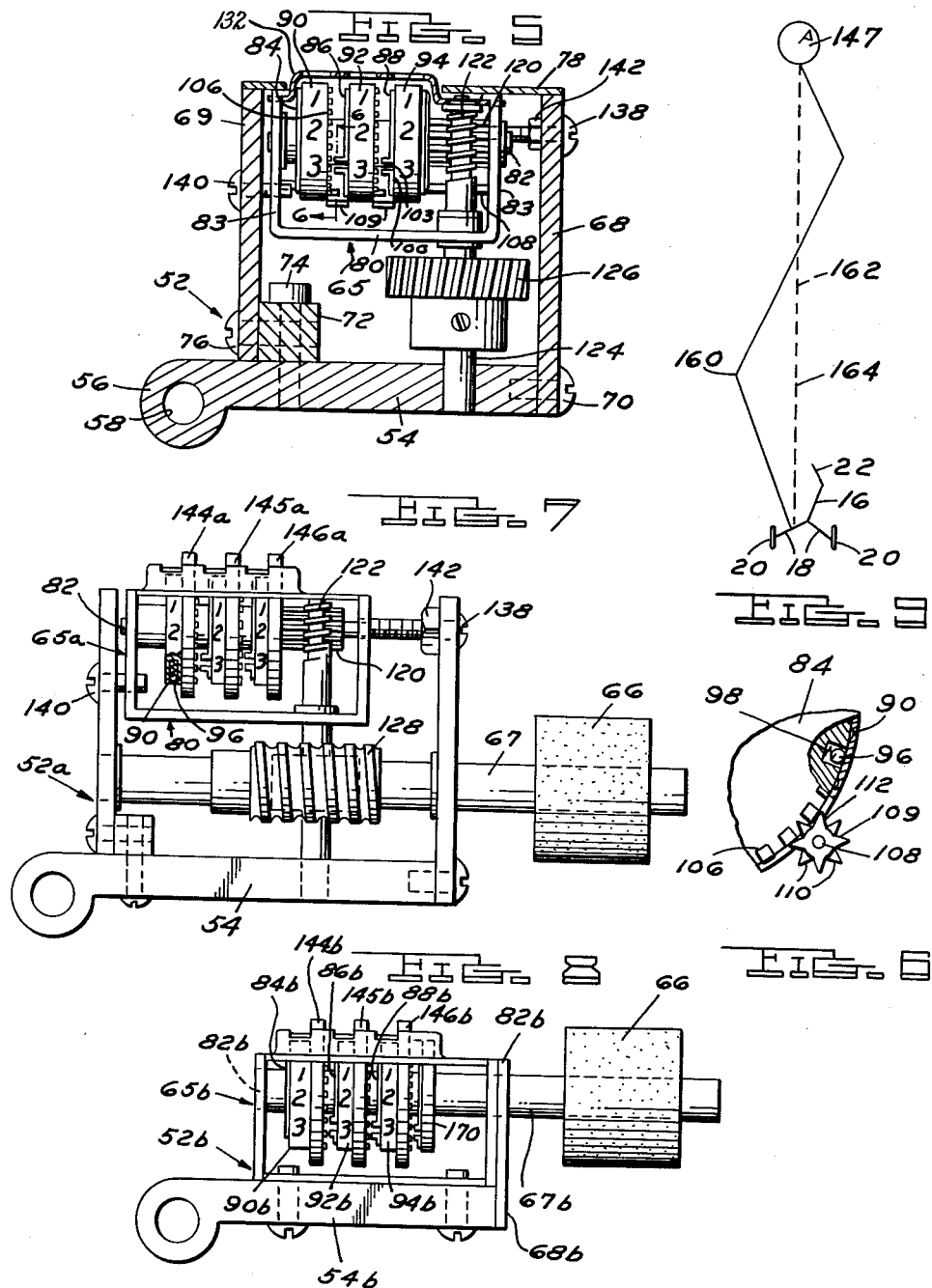

3,203,353
YARDAGE INDICATOR ATTACHMENT FOR
A GOLF CART
James E. Nowak, 19973 E. Williams Court, and Robert
T. Quail, 2073 Hawthorne, both of Grosse Pointe
Woods, Mich.; and Charles R. Jenks, Jr., 22204 Sunny-
dale, St. Clair Shores, Mich.
Filed Oct. 15, 1963, Ser. No. 316,239
6 Claims. (Cl. 235—95)

This invention relates generally to a yardage indicator adapted to be attached to a golf cart for automatically indicating the distance from the ball to the green.

The selection of the proper golf club for a particular shot depends to a great extent upon the distance from the lie of the ball to the green. The golfer will select one club when he is 100 yards away from the green and a different club when the yardage to the green is 150 yards. If he miscalculates the distance he will inevitably select the wrong club. Since distances are deceiving, especially over rolling fairways, it is difficult even for an experienced golfer to judge fairway distances accurately.

One of the principal objects of this invention is to provide a device which will automatically indicate the distance from the lie of the ball to the green and thereby remove the guesswork and inaccuracies attendant upon a mere visual observation of the distance.

Another object is to provide a yardage indicator which is adapted to be attached to the golf cart and which operates in reverse as the cart is pulled along the fairway so as to provide at all times an immediate indication of the distance remaining to the green.

Another object is to provide a device having a counter assembly for registering and visually indicating distances and also having a driving wheel for operating the counter assembly, and means for mounting the device on the golf cart in a manner such that the driving wheel engages and is rotated by one of the wheels of the golf cart and operates the counter assembly in reverse when the golf cart is moved along the ground.

Another object is to provide a novel mounting for the device which permits universal adjustment of the device so that it can be orientated properly with respect to the wheel of the golf cart.

Another object is to provide an L-shaped bracket bar, one arm of which provides a spindle on which the device is rotatably mounted, a mounting block rotatably and slidably receiving the other arm of the bracket bar, and means for locking the other arm on the mounting block in selected positions of longitudinal and rotative adjustment.

Another object is to provide means for securing the mounting block on a second block, which latter is adapted to be secured directly to the golf cart, in selected positions of rotation about an axis parallel to the spindle axis.

Another object is to provide pre-set wheels which may be separate from or integral with the counter wheels of the counter assembly, which pre-set wheels are manually operable to pre-set the counter wheels.

These and other objects and features of the invention will become more apparent from the following description, when considered with the accompanying drawings, wherein:

FIGURE 1 is an elevational view of the apparatus embodying our invention shown attached to a strut of a golf cart, the golf cart being fragmentarily shown in dot-dash lines.

FIGURE 2 is a sectional view taken on the line 2—2 of FIGURE 1.

FIGURE 3 is a sectional view taken on the line 3—3 of FIGURE 2.

FIGURE 4 is a sectional view taken on the line 4—4 of FIGURE 2.

FIGURE 5 is a sectional view taken on the line 5—5 of FIGURE 3.

FIGURE 6 is a fragmentary sectional view taken on the line 6—6 of FIGURE 5.

FIGURE 7 is an elevational view illustrating a modification.

FIGURE 8 is an elevational view illustrating another modification.

FIGURE 9 is a schematic view indicating the manner in which the invention is used.

Referring now more particularly to the drawings and especially to FIGURES 1-6, the apparatus or attachment comprises the device generally indicated at 10 and the mounting for the device generally designated 12. The attachment is adapted to be attached to the golf cart generally designated 14. The golf cart is schematically shown in FIGURE 9 as comprising an elongated body 16, wheel supporting struts 18 diverging downwardly from the lower end of the body 16, and wheels 20 rotatably supported on the lower ends of the struts. A handle 22 projects forwardly from the upper end of the body 16 for pulling the cart along the ground. As shown in FIGURE 1, the attachment is connected to one of the struts 18 of the golf cart.

Referring to FIGURE 2, the mounting 12 includes a supporting block 24 which has an arcuate recess 26 on one side. The block is secured to one of the struts 18 in the manner shown so that the strut is partially received in the recess 26. The strap 28 secured at its ends to the block 24 by fasteners 30 extends around the strut and thereby firmly and securely mounts the block 24 on the strut. The mounting 12 also includes a mounting block 32. A threaded fastener 34 threads into the block 24 and extends through a hole in block 32 to rotatably support the latter. When the fastener is tightened, its head 36 clamps the block 32 firmly against the flat surface 38 of block 24. The face of block 32 which engages surfaces 38 is serrated as indicated at 40 to improve the clamping action and resist the tendency of the block 32 to rotate. When the block 24 is mounted on the strut 18 as shown, fastener 34 extends at right angles to the common axis of the cart wheels 20.

The block 32 has a passage 42, at right angles to fastener 34, in which is received one arm 44 of the L-shaped mounting bracket bar 46. The entire bracket bar is of uniform cross-section throughout its length and its arm 44 is capable of rotating and sliding in the passage 42. A set screw 48 threaded in the mounting block 32 can be advanced by rotation into the passage 42 to bear against the arm 44 of the bracket bar to lock it against rotating and axial sliding movement. The device 10 is mounted on the other arm 50 of the bracket bar, it being apparent that arms 44 and 50 form a 90° angle.

As shown in FIGURE 5, the device 10 includes a support in the form of a housing 52. The housing 52 has a plate 54 provided with an enlargement 56 at one end having a cylindrical passage 58 therein through which extends the arm 50 of the bracket bar 46. The housing 52 can slide axially and rotate on the arm 50. The end of arm 50 is fork-shaped as shown in FIGURE 3, and a pin 59 extends across the slot 60 thereof. A finger 61 in slot 60 swings on pin 59. When finger 61 extends transversely, as in FIGURE 2, it prevents the device from sliding off the end of arm 50. The slot 60 is deep enough to permit finger 61 to swing 90° from the FIGURE 2 position, and since the finger is no wider than the thickness of arm 50, the device 10 can then slide off the arm. A helical spring 62 encircles arm 50 on the opposite side of device 10, and has one end 63 fixed to the arm. The opposite end 64 of the spring bears on plate 54 tending to rotate the device 10 counterclockwise in FIGURE 1. When the device 10 is assembled on the arm 50 of bracket bar 46 in the manner shown in FIGURE 2, spring 62 is axially compressed and urges the device 10 to the left against finger 61.

The device 10 has within the housing a counter assembly 65 which is operated by a driving wheel 66 secured to a shaft 67 mounted for rotation in the housing 52. When mounted on the golf cart as shown in FIGURE 1, the driving wheel 66 is adapted to engage the periphery of one of the ground engaging wheels 20 to be rotated thereby, thus to operate the counter assembly 65.

The housing 52 also includes the side plates 68 and 69, plate 68 being secured directly to the plate 54 by fasteners 70 and plate 69 being secured to the plate 53 by means of the block 72 and fasteners 74 and 76. A cover plate 78 extends along the margins of the side plates 68 and 69 to complete the enclosure.

The counter assembly 65 includes a generally U-shaped frame 80, and has a shaft 82 extending across and journaled in the legs 83 of the frame. The concentric spaced counter wheels 84, 86 and 88 are rotatably mounted on the shaft 82. Each counter wheel has an indicia bearing sleeve mounted thereon designated, respectively, 90, 92 and 94. As shown in FIGURE 6, the sleeve 90 is held from rotation with respect to its wheel 84 by a spring pressed ball 96 housed in a socket in the wheel and pressed radially outward by a spring 98 into one of a series of circumferentially spaced recesses along the inner surface of the sleeve 90. The sleeve 90 is thus held from rotation with respect to the wheel but can be rotated with respect thereto if enough torque is applied to cam the retaining ball out of its recess. It will be understood that the other indicia bearing sleeves are mounted on their respective counter wheels 86 and 88 in the same manner.

The wheel 88 has the axially protruding teeth 100 and with a slot 103 between the teeth. The adjacent end of the wheel 86 has a series of circumferentially spaced teeth 106 projecting toward the wheel 88. A shaft 108 extending across the legs 83 of frame 80 has a pinion 109 thereon provided with alternate narrow and wide teeth 110 and 112. One of the narrow teeth will extend between two teeth 106 of wheel 86, and the wide teeth on both sides thereof will rest on the periphery of the wheel 88. Hence the wheel 86 is normally held from rotation. However, when one of the teeth 100 on wheel 88 passes the narrow tooth it will rotate the same and cause a wide tooth to enter the slot 103 and simultaneously to enter between two teeth 106 on wheel 86 so that continued rotation of the wheel 88 will index the wheel 88 one-teeth of a revolution. This type of arrangement, whereby a full revolution of one counter wheel will index the next counter wheel one-tenth (1/10) of a revolution is a standard arrangement. A similar arrangement is provided for indexing the wheel 84 one-tenth (1/10) of a revolution upon each full revoution of the wheel 86, and accordingly the same referene numerals designate corresponding parts.

The counter wheel 88 has secured to it a worm wheel 120 in mesh with a worm 122 secured on shaft 124. The shaft 124 is journaled for rotation in the base of the U-shaped frame 80 and in the plate 54. The shaft 124 also has a worm wheel 126 secured to it which meshes with a worm 128 on the shaft 67. The shaft 67 is journaled for rotation in the plates 68 and 69 of the housing 52 and carries the driving wheel 66.

The cover 78 of housing 52 has an opening through which protrudes a dust plate 132 which is part of the counter assembly and is secured to the U-shaped frame 80. The dust plate is slotted at 134 to expose the indicia sleeves 90, 92 and 94.

The U-shaped frame 80 of the counter assembly is adjustably positioned in the housing by screws 138 and 140 which pass freely through the side plates 68 and 69 and have threaded engagement with the legs 83 of the U-shaped frame 80. The screws 138 and 140 are rotated to effect the adjustment. A nut 142 threaded on screw 138 within the housing is advanced into contact with the plate 68 to lock the counter assembly in adjusted position.

A shaft 143 within housing 52 is parallel to shaft 82 and is supported on walls 68 and 69. Shaft 143 rotatably supports the pre-set wheels 144, 145 and 146. These pre-set wheels respectively peripherally contact the indicia sleeves 90, 92 and 94. The rims or peripheral surfaces of the pre-set wheels are preferably covered with a friction material such as rubber which engages the sleeves under enough pressure that when a pre-set wheel is rotated, it will also cause the sleeve it contacts to rotate on its counter wheel (the torque being sufficient to cam the retaining ball 96 out of its recess so that the sleeve can rotate relative to the counter wheel). The pre-set wheels project through slots in the cover 78 and, being independently rotatable, can be manually operated to pre-set any of the indicia bearing sleeves.

In use, the block 24 is secured to a strut of the golf cart as shown in FIGURES 1 and 2, and when thus attached the fastener 34 extends at right angles to the aligned axes of the wheels of the golf cart. The block 32 is clamped in the desired position by fastener 34, and bracket bar 46 is located by set screw 48 in the desired position of longitudinal and rotative adjustment. The arm 50 should extend at right angles to the aligned axes of the wheels 20 of the cart, so that it is disposed parallel to the path of movement of the cart. The spring 62 presses the device in a counter-clockwise direction as viewed in FIGURE 1 to hold the driving wheel 66 in bearing engagement with the periphery of the ground engaging wheel of the cart.

When the golfer is ready to tee up, he will pre-set the indicia bearing sleeves 90, 92 and 94 on the counter wheels to indicate the yardage to the green 147. This information will be found on the score card and is usually posted at the tee. As will be understood, the numbers run from 0-9 on each indicia bearing sleeve. The sleeve 94 indicates the units of yardage, the sleeve 92 is the 10's and the sleeve 90 is the 100's. These sleeves are individually pre-set by the manual pre-set wheels 144, 145 and 146. After the golfers hits his tee shot, he will pull the golf cart down the fairway in a forward direction more or less along the dotted line indicated in FIGURE 9. His tee shot may stop rolling at the point indicated at 160, which is somewhat to one side of a straight line to the green. However, the golfer will preferably walk along the dotted line 162 which is a straight line to the green so that the yardage indicator will provide a more accurate reading of the distance to the green. The counter is mounted on the cart so that it operates in reverse when the cart is pulled in the forward direction indicated in FIGURE 9. Assuming that the hole is 425 yards long, in which event the counter will initially be set to read 425 yards, the yardage indicated will gradually reduce as the cart is pulled in the forwad direction toward the green. If the tee shot is 210 yards, then the counter will read 215 yards when the cart is pulled along in a forward direction up to the lie of the ball. The cart will preferably be drawn up to a point parallel to the lie of the tee shot, or to the point indicated at 164 in FIGURE 9. Point 164 is where a line from the lie would intersect the dotted line 162, drawn normal to the latter. Obviously if the cart is drawn over to the point 160, it would not provide as accurate an indication of the yardage remaining to the green. Knowing that 215 yards remain to the green, the golfer can then select the next club to be used without relying upon visual observation of the distance remaining.

The use of this counter becomes more and more important as the golfer approaches the green. As the golfer gets close to the green it may become very important to decide whether a 7 or an 8 iron ought to be used, but due to the hills and valleys often found on fairways the distance to the green may be deceiving. The counter will provide an accurate measure of that distance. For greater accuracy, the cart should be pulled more or less on a straight line toward the green. However, very wide shots into the rough would require the golfer to park his cart quite some distance from the lie of the ball if he parked it on a true straight line to the green. For that reason, he may wish to park his cart at some intermediate point between the lie of the ball and a straight line to the green, making a comprise between accuracy of the meter reading and convenience.

When he reaches the next tee, the golfer will reset teh counter wheels to indicate the yardage to the next green.

FIGURE 7 illustrates a modification in which the housing 52a is substantially like the housing 52 previously described except that the cover plate 78 is omitted. The counter assembly 65a is the same except for the fact each indicia bearing sleeve has an enlarged rim formed integrally with it. The rims are designated 144a, 145a and 146a, and serve the function of the pre-set wheels. Hence the provision of separate pre-set wheels on a separate shaft is not required because the individual sleeves may be manually reset by the enlargements or rims thereon. These rims of course project through the sight openings provided for viewing the indicia on the wheel. Otherwise the device is the same as that shown in FIGURE 5, and corresponding parts bear similar characters of reference. The counter assembly 65a, like the counter assembly 65, will be provided with a shaft similar to shaft 108 and pinions like the pinions 109 for indexing the counter wheels, but such structure is not shown in FIGURE 7 for the sake of simplicity of illustration.

FIGURE 8 shows a further modification in which the counter assembly 65b is like the counter assembly 65a except for certain exceptions which will be described. The shaft 67b for the driving roller 66 is connected directly to a wheel 170 which is a concealed counter wheel of the counter assembly 65b. The wheel 170 as well as the wheels 84b, 86b and 88b are mounted for rotation on the shaft 82b. The counter wheels 84b, 86b and 88b have the indicia bearing discs 90b, 92b and 94b and are rotated in turn by the first wheel 170 through the same indexing mechanism described in connection with the first embodiment. However, the indexing pinions, similar to pinions 109 in FIGURE 5, have been omitted for the sake of simplicity. The arrangement is such, however, that one full revolution of wheel 170 will turn wheel 88b one-tenth (1/10) of a revolution, one revolution of wheel 88b will index wheel 86b one-tenth (1/10) of a revolution, etc. The essential difference in this embodiment is that the shaft for the driving roller 66 is connected directly to the wheels of the counter mechanism instead of being geared to it by separate worms, worm wheels and shafting. The additional concealed wheel 170 of the counter mechanism is provided to take the place of the gear reducing worms and worm wheels in the previous embodiments. The housing in FIGURE 8 is indicated at 52b and consists merely of the plate 54b and slide plate 68b to which the counter assembly 65b is rigidly secured. The indicia bearing sleeves 90b, 92b and 94b are like the sleeves in FIGURE 7 and likewise have pre-set rims 144b, 145b and 146b.

What we claim as our invention is:

1. Apparatus for use with a golf cart to automatically indicate the distance from the ball to the green comprising a device having a counter assembly for registering and visually indicating distances, said device also having a rotatable driving wheel for operating said counter assembly, and means for mounting said device on said golf cart in a manner such that said driving wheel engages and is rotated by one of the wheels of said golf cart and operates said counter assembly in reverse when said golf cart is moved along the ground, said mounting means including an L-shaped bracket bar one arm of which provides a spindle on which said device is rotatably mounted, a spiral spring encircling said spindle and urging said device in such a direction about the axis of said spindle as to press said driving wheel against said one wheel of said golf cart, a mounting block rotatably and slidably receiving the other arm of said bracket bar, means for locking said other arm on said mounting block in selected positions of longitudinal and rotative adjustment, said mounting means also including a second block adapted to be secured directly to said golf cart, and means for securing said mounting block on said second block in selected positions of rotation about an axis parallel to the axis of said spindle, one of said blocks having serrations contacting the other to resist relative rotation.

2. Apparatus for use with a golf cart to automatically indicate the distance from the ball to the green comprising a device having a support, a counter assembly for registering and visually indicating distances mounted on said support, said counter assembly having one or more rotatable counter wheels which rotate when said counter assembly is operated and which have indicia thereon, said device also having a rotatable driving wheel operatively connected to said counter wheels to rotate the latter when said driving wheel rotates, means for mounting said device on said golf cart in a manner such that said driving wheel engages and is rotated by one of the wheels of said golf cart and operates the counter wheels of said counter assembly in reverse when said cart is moved along the ground, said counter assembly including a frame, a shaft carried by said frame on which said counter wheels are supported, means for adjusting said frame relative to said support, said adjusting means including an adjusting screw carried by said support and having threaded connection with said frame, and manually rotatable pre-set wheels carried by said support and respectively having friction peripheral contact with said counter wheels whereby said counter wheels can be manually pre-set by rotation of said pre-set wheels.

3. Apparatus for use with a golf cart to automatically indicate the distance from the ball to the green comprising a device having a counter assembly for registering and visually indicating distances, said device also having a rotatable driving wheel for operating said counter assembly, and means for mounting said device on said golf cart in a manner such that said driving wheel engages and is rotated by one of the wheels of said golf cart and operates said counter assembly in reverse when said golf cart is moved along the ground, said mounting means including an L-shaped bracket bar the arms of which extend at right angles to one another, one of said arms providing a spindle on which said device is rotatably mounted, a spring on said spindle urging said device in such a direction about the axis of said spindle as to press said driving wheel against said one wheel of said golf cart, a mounting block rotatably and slidably receiving the other arm of said bracket bar, means for locking said other arm to said mounting block in selected positions of longitudinal and rotative adjustment, a member for connecting said mounting block to said golf cart having a pin at right angles to said other arm, and means for locking said block in selected positions of rotation on said pin.

4. The apparatus defined in claim 3, wherein said spindle has a stop near its free end engageable with one side of said device to block axial movement thereof toward said free end, said stop being retractable to clear said device and permit said device to be removed from said free end, and said spring is a spiral spring which encircles said spindle and bears against the opposite side of said device and urges said device axially toward and against said stop.

5. The apparatus defined in claim 4, wherein said device has a plurality of rotatable counter wheels provided with indicia thereon for visually indicating distances, an operative connection between said driving wheel and said counter wheels to rotate the latter when said driving wheel rotates, said device also having manually rotatable pre-set wheels respectively in friction peripheral contact with said counter wheels whereby said counter wheels can be manually pre-set by rotation of said pre-set wheels.

6. The apparatus defined in claim 4, wherein said device has a plurality of rotatable counter wheels provided with indicia thereon for visually indicating distances, an operative connection between said driving wheel and said counter wheels to rotate the latter when said driving wheel rotates, each counter wheel having as a fixed part thereof a concentric rim, said rims projecting radially beyond said counter wheels and providing pre-set wheels for the manual pre-setting of said counter wheels.

References Cited by the Examiner

UNITED STATES PATENTS

| | | | |
|---|---|---|---|
| 587,010 | 7/97 | Mackintosh | 235—96 |
| 845,513 | 2/07 | Bullard | 235—96 |
| 853,339 | 5/07 | Boon | 235—96 |
| 1,742,567 | 1/30 | West. | |
| 1,749,365 | 3/30 | Zubaty. | |
| 2,521,104 | 9/50 | Welch. | |
| 2,711,027 | 6/55 | Williamson | 235—132 |
| 2,724,361 | 11/55 | Coffin | 235—95 X |
| 2,742,229 | 4/56 | Hacking | 235—95 |
| 2,766,935 | 10/56 | Klein | 33—141 |

FOREIGN PATENTS

| | | |
|---|---|---|
| 489,514 | 7/38 | Great Britain. |

LEO SMILOW, *Primary Examiner.*

LEYLAND M. MARTIN, *Examiner.*